United States Patent [19]

Teske

[11] Patent Number: 4,807,740
[45] Date of Patent: Feb. 28, 1989

[54] TROUGH-TYPE CHAIN CONVEYOR FOR BULK MATERIAL

[76] Inventor: Lothar Teske, Hegelstr. 15, D-5000 Köln, Fed. Rep. of Germany

[21] Appl. No.: 86,726

[22] Filed: Aug. 17, 1987

[51] Int. Cl.[4] .............................................. G10G 11/08
[52] U.S. Cl. ..................................... 198/505; 198/561; 198/720; 198/525
[58] Field of Search ................... 198/536, 504, 5, 561, 198/525, 720

[56] References Cited

U.S. PATENT DOCUMENTS

| | | | |
|---|---|---|---|
| 924,332 | 6/1909 | Fleming | 198/525 X |
| 2,209,476 | 7/1940 | Redler | 198/720 |
| 2,375,697 | 5/1945 | Sinden | 198/525 |
| 3,731,397 | 5/1973 | Kayatz et al. | 198/525 X |
| 3,810,537 | 5/1974 | Hungtington | 198/525 X |
| 4,163,489 | 8/1979 | Wahl | 198/505 |
| 4,250,987 | 2/1981 | Trammell et al. | 198/561 X |
| 4,366,628 | 1/1983 | George | 198/561 X |

Primary Examiner—Robert J. Spar
Assistant Examiner—D. Glenn Dayoan
Attorney, Agent, or Firm—Herbert Dubno; Andrew Wilford

[57] ABSTRACT

A conveyor is used in combination with a supply of bulk material having an outlet of a predetermined relatively great transverse width to move the material from the outlet to an output location longitudinally and horizontally offset from the outlet in a transport direction. This conveyor has a trough itself having an intake of generally the large transverse width and opening upward at the outlet of the supply for receiving bulk material therefrom, a base extending in the direction, and a pair of side walls extending upward from the base and also extending in the direction. The side walls flare upward away from each other at least at the intake and have upper edges spaced transversely apart at the intake by the transverse width and lower edges spaced transversely apart generally along the full length of the trough by a relatively small transverse width. An endless conveyor chain carrying transversely projecting pushers has a lower stretch immediately juxtaposed in the trough with the base thereof and an upper stretch extending in the trough above the lower stretch and underneath the intake. The chain is driven to advance the lower stretch in the transport direction and move the material from the intake to the outlet and to advance the upper stretch opposite to this direction to break up the incoming bulk-material stream at the intake.

2 Claims, 1 Drawing Sheet

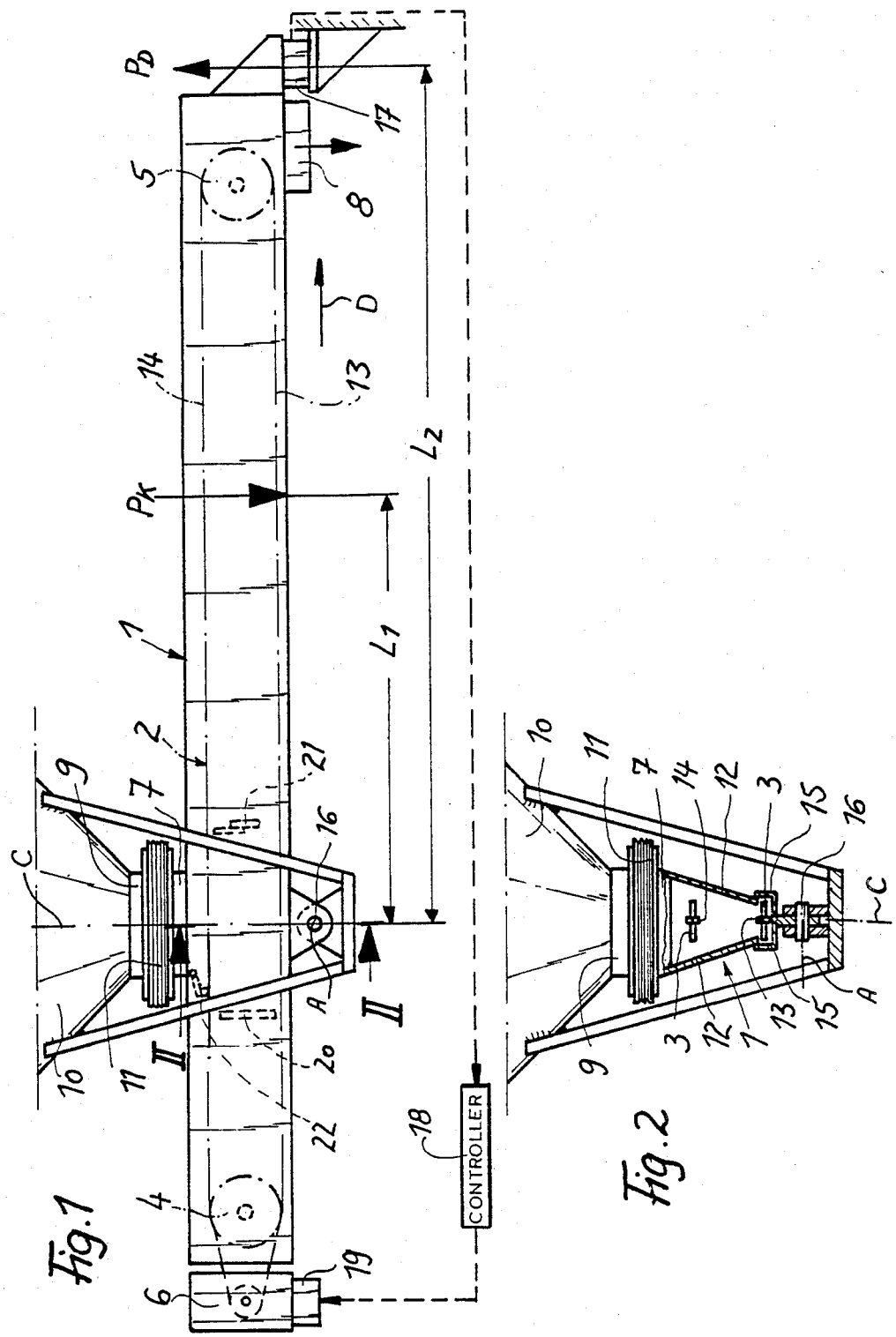

TROUGH-TYPE CHAIN CONVEYOR FOR BULK MATERIAL

FIELD OF THE INVENTION

The present invention relates to a trough-type chain conveyor for bulk material. More particularly this invention concerns such a conveyor used to move gravel, ore, coal, or the like from a supply hopper or silo to an output location horizontally offset therefrom.

BACKGROUND OF THE INVENTION

A standard trough-type conveyor for bulk material has a trough having an intake of generally the same large transverse width as the outlet of the supply hopper or silo and opening upward underneath this outlet for receiving bulk material therefrom. In addition the trough has an output opening downward at the output location, a base extending in the direction, and a pair of side walls extending upward from the base and also extending in the direction. These side walls are normally vertical and spaced apart by the wide transverse dimension of the supply outlet so that material can fall unimpeded from the supply directly into the trough. An endless conveyor chain carrying transversely projecting pushers has an upper stretch immediately juxtaposed in the trough with the base thereof and a lower stretch extending beneath the trough. The chain is driven so its upper stretch advances in an upstream-to-downstream transport direction to move the material from the intake to the outlet of the trough.

As a result of the necessity of making the conveyor trough as wide as the supply outlet, to prevent arches from forming or the material from otherwise jamming at the intake, the entire machine is fairly bulky. This is particularly disadvantageous since such a conveyor is rarely if ever called upon to move the bulk material at a rate (volume or mass per unit of time) sufficiently great to actually need this large cross section. As a result such a conveyor is normally run at very low speed. This is very disadvantageous as it means that a large mass of the bulk material must be moved for what is often a very low throughput.

Another disadvantage of the known conveyors is that they are very difficult to accurately control. Determining just how much material is being moved and controlling it accurately is very difficult in view of the large mass being displaced and the low advance speed of the conveyor chain.

OBJECTS OF THE INVENTION

It is therefore an object of the present invention to provide an improved trough-type chain conveyor for bulk material.

Another object is the provision of such a trough-type chain conveyor for bulk material which overcomes the above-given disadvantages, that is which is compact, operates efficiently, and is easy to control.

SUMMARY OF THE INVENTION

The instant invention is used in combination with a supply of bulk material having an outlet of a predetermined relatively great transverse width to move the material from the outlet to an output location longitudinally and horizontally offset from the outlet in a transport direction. This conveyor has a trough itself having an intake of generally the large transverse width and opening upward underneath the outlet of the supply for receiving bulk material therefrom, an output opening downward at the output location, a base extending in the direction, and a pair of said walls extending upward from the base and also extending in the direction. An endless conveyor chain carrying transversely projecting pushers has a lower stretch immediately juxtaposed in the trough with the base thereof and an upper stretch extending in the trough above the lower stretch and underneath the intake. Thus a stream of bulk material passing out of the supply outlet and into the trough intake is longitudinally traversed by the upper stretch. The chain is driven to advance the lower stretch in the transport direction and move the material from the intake to the outlet and to advance the upper stretch opposite to this direction and break up the incoming bulk-material stream at the intake.

As a result the necessity of providing a distributor plate, an arch breaker, or the like is wholly eliminated. The upper stretch breaks up the flow into the conveyor just at the intake, wholly avoiding any possibility of clogging. The problem of the intake clogging is completely avoided by having the upper chain stretch move through the incoming stream from the supply at this intake. Thus this problem of jamming at the intake, which is the main reason prior-art conveyors were made wide, is cured by the construction according to this invention that allows the trough to be made, as described, fairly slim.

According to another feature of this invention the side walls flare upward away from each other at least at the intake and have upper edges spaced transversely apart at least at the intake by the transverse width and lower edges spaced transversely apart generally along the full length of the trough by a relatively small transverse width.

Thus the conveyor of this invention is substantially smaller than the prior-art devices because it is quite slim, that is of a relatively small cross-sectional size downstream of the intake. Simply making the conveyor smaller is clearly advantageous in that it holds down fabrication costs. In addition the small cross section means that the machine in reality is moving a small stream of the bulk material so that the amount of energy it will consume moving a given amount of material will be much lower than in a prior-art system. This fact allows the chain to be advanced fairly rapidly so that it works efficiently while only moving the required amount of the bulk material. In addition the fact that only a small stream of the material is being moved makes it possible to control the throughput fairly accurately.

According to the present invention the relatively large transverse width is about twice as great as the relatively narrow width of the lower side-wall edges. In addition the side walls form adjacent the base horizontally confronting and longitudinally extending grooves in which the pushers engage and slide.

In order to even flow in the conveyor the trough is provided with upstream and downstream shields longitudinally flanking the intake and each blocking the trough between the upper and lower chain stretches. The downstream shield is vertically adjustable. A scraper engages the upper stretch immediately upstream in the direction from the intake. Thus flow in the intake region is regular and smooth.

The output of the conveyor is regulated by pivoting the trough for limited rocking about a horizontal axis directly underneath the intake and transverse to the direction. A sensor supports the trough downstream of the intake and generates an output corresponding to the weight of the trough and its contents downstream of the intake. A controller is connected to the sensor and to the motor for varying the rate of advance of the lower stretch in accordance with the sensed weight of the trough and its contents downstream of the intake. This controller can periodically at regular intervals take the weight measurement and easily mathematically determine the throughput of the device based on several fixed factors determined by trough size and empty weight and the two changing or changeable variables of detected mass and chain speed.

DESCRIPTION OF THE DRAWING

The above and other objects, features, and advantages will become more apparent from the following, reference being made to the accompanying drawing in which:

FIG. 1 is a partly diagrammatic small-scale side view of the apparatus according to this invention; and FIG. 2 is a vertical cross section taken along line II—II of FIG. 1.

SPECIFIC DESCRIPTION

As seen in FIGS. 1 and 2 a bulk-material conveyor according to this invention has a horizontally elongated trough 1 in which is provided an endless conveyor chain 2 having crossbars 3 and spanned between an upstream drive sprocket 4 rotatable about a horizontal axis perpendicular to the trough 1 and a downstream idler sprocket 5 rotatable about a parallel axis. Adjacent its upstream (left-hand in FIG. 1) end the trough 1 has an upwardly open circular intake port 7 and at its extreme downstream end this trough 1 has a downwardly open outlet port 8 roughly under the sprocket 5. A motor 6 at the upstream end of the trough 1 powers the sprocket 4.

The intake port 7 is directly aligned under the substantially identically shaped lower output end 9 of a silo 10 containing bulk material, with a cuff 11 interconnecting the two and allowing some relative movement. As best seen in FIG. 2 the trough 1 has side walls 12 that are inclined at least at the intake 7 upward away from each other, symmetrically relative to a centerline or axis C of the port 7 and outlet 9. Thus at their upper edges 12 the spacing of the two sides 12 is about equal to the diameter of the intake 7 but at their lower edges they are much more closely spaced.

The chain 2 has a lower stretch 13 that runs along the bottom of the trough 15, with the ends of the pusher bars 3 of this lower stretch 12 received in horizontally confronting insets or grooves 15 extending along the lower edge of the trough 1. In addition the chain 2 has an upper stretch 14 which runs normally above the bulk material in the trough 1 except at the intake 7 where it runs right through the descending stream of this bulk material. Thus there will be no possibility of blockage at this intake 7 in spite of the fact that the conveyor has an effective width that is here less than half of the crosswise dimension of its intake port 7 since the stream of material entering will be broken up and stirred by the upper stretch 14 as it moves counter to the left-to-right transport direction D of the system.

The entire trough 1 can rock about a horizontal axis A defined by a horizontal pivot 16 suspended from the hopper 10 and lying directly under the trough 1 on the centerline C of the intake 7. The downstream end of the trough 1 is supported via a pressure-detecting strain gauge 17 on a fixed point. This gauge 17 is connected via an electronic controller 18 to a pulse-type speed controller 19 that itself operates the drive motor 6 for the system.

Thus it is possible for the controller 18 to accurately monitor and change the output in units of mass relative to units of time. The downward force $P_K$ exerted by the bulk material in the trough 1 at a centerpoint downstream of the centerline C by a distance $L_1$ can easily be calculated from the force $P_D$ exerted at the gauge 17, taking into account of course the longer distance $L_2$ this gauge 17 is downstream of the centerline C. The controller 19 knows and can control the advance rate of the chain 2 by means of the speed regulator 19 so as to establish virtually any desired output rate.

In order to ensure finer control the trough 1 is provided upstream and downstream of the port 7 and between the lower and upper reaches 13 of the chain 2 with shields 20 and 21 longitudinally equispaced to either side of the centerline C. The downstream shield 21 has a vertically adjustable lower edge so that it basically determines the depth the bulk material will have in the trough 1. In addition a scraper 22 is provided to keep the upper stretch 14 clear slightly upstream of the port 7.

Thus with the system of this invention the relatively slim trough 1 can transport bulk material from a wide-mouth supply with no likelihood of jamming or clogging. In addition the system can easily monitor and control the throughput rate while operating very efficiently.

I claim:

1. In combination with a supply of bulk material having an outlet of a predetermined relatively great transverse width, a conveyor for moving the material from the outlet to an output location longitudinally and horizontally offset from the outlet in a transport direction, the conveyor comprising:

a trough having
 an intake of generally the large transverse width and opening upwardly underneath the outlet of the supply for receiving bulk material therefrom,
 an output opening downward at the output location,
 a base extending in the transport direction, and
 a pair of side walls extending upward from the base and also extending in the transport direction, the side walls flaring upward away from each other at least at the intake and having upper edges spaced transversely apart at least at the intake by the transverse width and having lower edges spaced transversely apart generally along the full length of the trough by a transverse width substantially smaller than the great width of the upper edges and intake;

an endless conveyor chain carrying transversely projecting pushers and having a lower stretch immediately juxtaposed in the trough with the base thereof and an upper stretch extending in the trough above the lower stretch and underneath the intake, whereby a stream of bulk material passing out of the supply outlet and into the trough intake is longitudinally traversed by the upper stretch;

drive means for driving the chain and thereby advancing the lower stretch in the transport direction to move the material from the intake to the output and to advance the upper stretch opposite to this transport direction and break up the incoming bulk-material stream at the intake;

a pivot supporting the trough for limited rocking about a horizontal axis directly underneath the intake and transverse to the transport direction;

means including a sensor supporting the trough downstream of the intake for generating an output corresponding to the weight of the trough and its contents downstream of the intake; and control means connected to the sensor and to the drive means for varying the rate of advance of the lower stretch in accordance with the sensed weight of the trough and its contents downstream of the intake.

2. The bulk-material conveyor defined in claim 1 wherein the intake and outlet are both centered above the pivot axis, whereby the material stream falls to both sides of the axis.

* * * * *